United States Patent [19]

Stewart et al.

[11] Patent Number: 5,731,816
[45] Date of Patent: Mar. 24, 1998

[54] SYSTEM AND METHOD FOR DIRECT MODELING OF FILLETS AND DRAFT ANGLES

[75] Inventors: Paul Joseph Stewart; Yifan Chen, both of Ann Arbor, Mich.

[73] Assignee: Ford Global Technologies, Inc., Dearborn, Mich.

[21] Appl. No.: 550,151

[22] Filed: Oct. 30, 1995

[51] Int. Cl.⁶ .................................................. G06T 17/00
[52] U.S. Cl. .............................................................. 345/419
[58] Field of Search .................................. 395/119, 120, 395/141, 142; 364/474.28, 474.29; 345/419

[56] References Cited

U.S. PATENT DOCUMENTS

| | | | |
|---|---|---|---|
| 4,785,399 | 11/1988 | Evans et al. | 395/142 X |
| 4,821,214 | 4/1989 | Sederberg | 364/522 |
| 5,119,309 | 6/1992 | Cavendish et al. | 364/474.24 |
| 5,345,546 | 9/1994 | Harada et al. | 395/120 X |
| 5,410,489 | 4/1995 | Seki et al. | 364/474.29 |

OTHER PUBLICATIONS

Stewart, P. J., "Direct Shape Control Of Free-Form Curves And Surfaces With Generalized Basis Functions", Ph.D. dissertation, Dept. of Naval Architecture and Marine Engineering, University of Michigan, 1991, 219 pgs.

Vince, John, "3-D Computer Animation", Addison-Wesley Publishing Company, Inc., copyright 1992, pp. 53-73, 143-145, 148-169, 240-247.

Watt, Alan, et al., "Advanced Animation And Rendering Techniques", Copyright 1992 by the ACM Press, pp. 65-110, 395-405.

*Primary Examiner*—Almis R. Jankus
*Attorney, Agent, or Firm*—David B. Kelley; Roger L. May

[57] ABSTRACT

A system and method for direct modeling of fillets and draft angles include forming a fillet region having a first transition from a surface feature to the fillet region and a second transition from a base surface to the fillet region while maintaining a predetermined continuity at the first and second transitions. The system and method select (75) a general form of a fillet profile with a single basis function to describe the fillet, apply (76) the fillet profile to either side of a constant central region on the surface feature to form a surface feature profile, and sweep (77) the surface feature profile within the feature boundary to form the fillet region. The present invention allows such fillet regions to be subsequently modified while maintaining the predetermined continuity at the first and second transitions by applying a reparametrization (78) to the basis function to modify the fillet region.

20 Claims, 8 Drawing Sheets

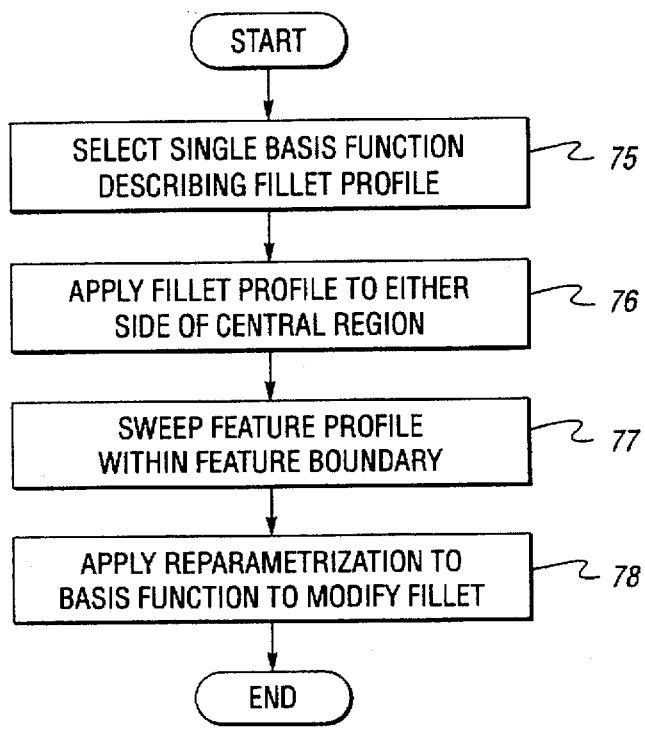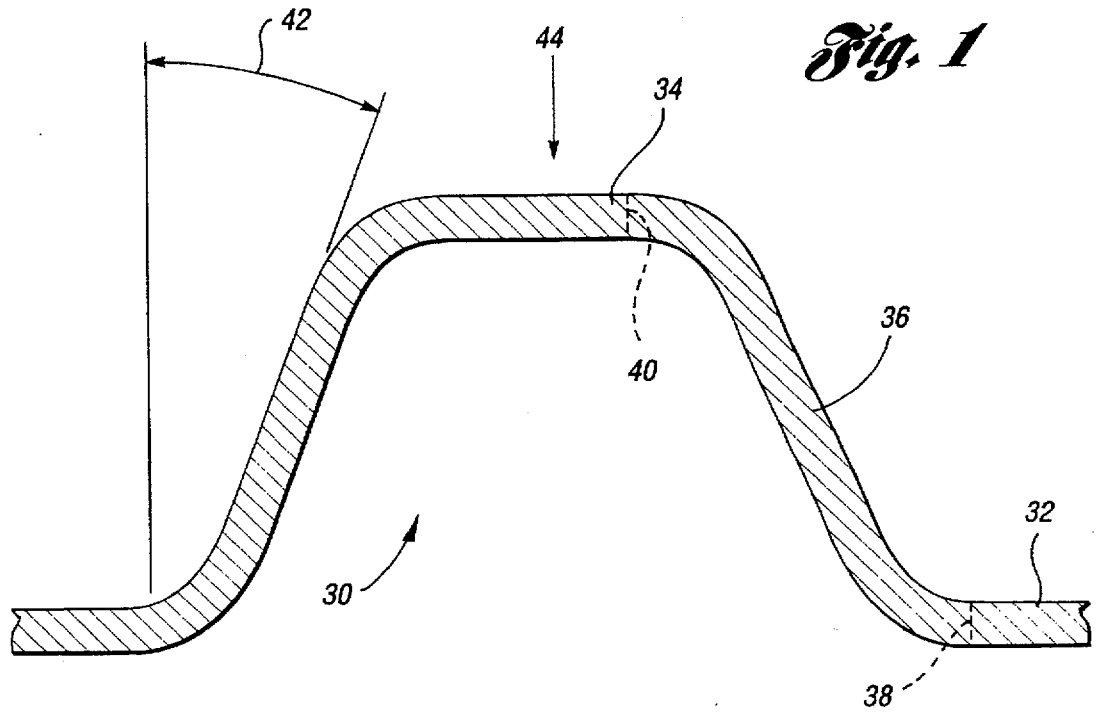

SYSTEM AND METHOD FOR DIRECT MODELING OF FILLETS AND DRAFT ANGLES

TECHNICAL FIELD

The present invention relates to a system and method for direct modeling of fillets and draft angles particularly suited for computer-aided design (CAD) applications.

BACKGROUND ART

Mathematical models of stamped sheet metal, particularly in automotive applications, consist of details which may be described as surface features positioned on relatively flat, free-form surfaces. Such surface features include, for example, structural reinforcement ribs of an inner panel, raised bosses for welding or bolt connections, door handle pockets and accent ridges of outer panels, and the draw beads on binder surfaces required for stamping, among others.

The location and form of each surface feature places constraints on part performance and tooling which require a number of considerations tending to complicate the process of sheet metal design and manufacture. The transition region between the surface feature and its associated free-form surface, known as the fillet, is a particularly troublesome aspect of feature geometry. While the fillet is often functionally uninteresting, its geometry places several constraints on the ultimate design of the part. For example, the fillet should be smooth to prevent stress concentrations and geometrically continuous to allow generation of feasible tool paths. For sheet metal stamping applications, the fillet should have a draft angle which accommodates forming of the feature by a stamping press and the shape of the feature should allow an appropriate amount of metal to be drawn across it.

While the design of a fillet region may be complex, demanding a considerable amount of design experience and designer interaction, it does not add a proportionate value to the final product. For computer aided design (CAD) applications, further complexity results from the mathematics used to describe the fillet region.

Prior art approaches require the design of many individual piece-wise fillet profiles linking the feature to the surface. This is a time consuming process depending on the experience of the designer and often leads to a significant amount of trial-and-error, resulting in a non-deterministic design process. Based on these fillet profiles, a geometric procedure is then applied to fit individual surface patches to the enclosed segments of the fillet.

The task of maintaining the fillet profiles may also become enormous when applied to a production part, such as a door inner panel. The problem is further compounded because features are often modified and moved frequently during the design process. This requires recreating the fillets after each change.

Thus, it would be desirable to have a system and method for effective fillet creation which would describe the fillet profile for an entire feature using constraints and parameters rather than specifying a set of geometric shapes. Such a description would be independent of the feature shape and location so that user intervention is not required when the feature is altered.

SUMMARY OF THE INVENTION

It is thus an object of the present invention to provide a system and method for direct modeling of fillets and draft angles using constraints and parameters which are independent of the particular feature shape and location so as to reduce or eliminate user intervention upon alteration of the feature.

In carrying out this and other objects of the present invention, a method is provided which includes describing a general form of a fillet profile with a single basis function, applying the fillet profile to either side of a constant central region, and sweeping the feature profile within the feature boundary. The fillet region may then be modified without disturbing the boundary conditions or continuity by applying a non-linear reparametrization derived from the generalized basis function to the fillet basis function.

A system is also provided for implementing a method in accordance with the present invention.

The advantages accruing to the present invention are numerous. The system and method of the present invention utilize individual design parameters which are decoupled and independent from one another so that they can match those aspects of the design which are important to the manufacturing process. For example, using the system and method of the present invention, the draft angle of the entire feature may be controlled with a single parameter and the inner and outer boundary continuities of the entire fillet region are described with separate parameters.

The present invention provides for slope adjustment which can be automatically applied to any fillet profile without introducing additional inflections to the fillet region. Furthermore, the fillet description remains unchanged for any feature shape and/or location on the base surface. Due to the fillet description according to the present invention, infinite parametric continuity is provided throughout the interior of the fillet region as compared to previous design tools which sometimes introduced low-order discontinuities to the fillet region.

The above object and other objects, features, and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIG. 1 is a cross-section of a surface feature and free-form surface illustrating a fillet region and draft angle;

FIG. 4 is a flow chart illustrating a method for direct modeling of fillets and draft angles according to the present invention;

BEST MODE FOR CARRYING OUT THE INVENTION

Figure 2:
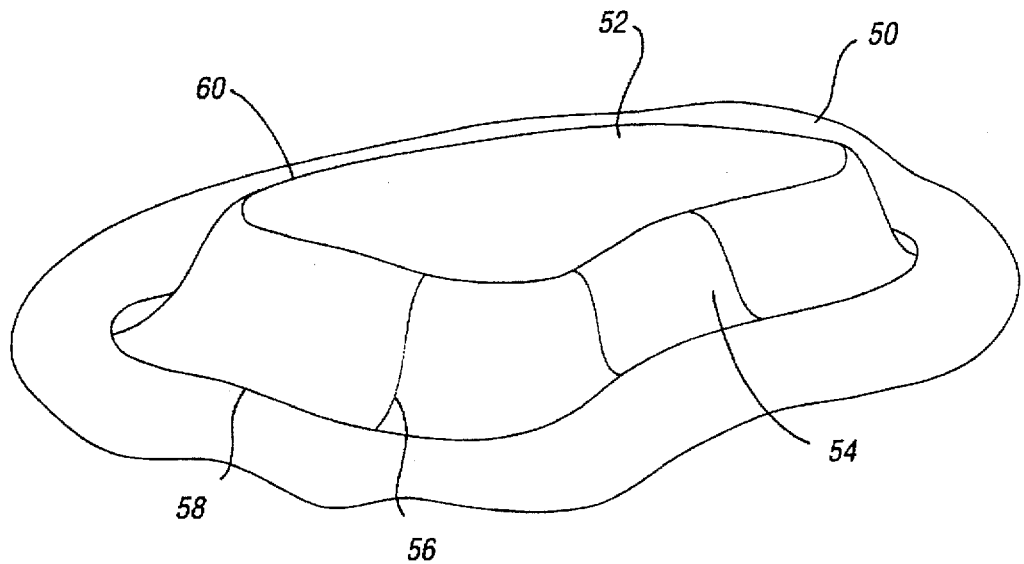
FIG. 2 is a pictorial representation of a sheet metal part illustrating prior art fillet generation by segmenting fillet regions.

Direct modeling of surface features and fillets according to the present invention is achieved with an interactive shape creation and manipulation method called Direct Surface Manipulation (DSM). This method allows the user to select and directly manipulate a point, called a reference point, on a parametric surface. The manipulation of this point is automatically propagated through generalized basis functions to a user defined region on the surface. To accommodate various user requirements, the basis functions possess various shape characteristics governed by a set of boundary continuity conditions.

The DSM features are additive and independent of each other, hence, modifications of a DSM feature, such as moving the feature on the surface or changing its boundary continuity conditions, does not require the regeneration of the entire surface. The DSM method is explained in greater detail by PAUL J. STEWART in "Direct Shape Control of Free-Form Curves and Surfaces with Generalized Basis Functions" a Ph.D. Dissertation for the Department of Naval Architecture and Marine Engineering at the University of Michigan, 1991, the disclosure of which is hereby incorporated by reference in its entirety.

FIG. 1 provides a cross-sectional view of a representative stamped sheet metal part 30. The design of such a part begins with a free-form base surface 32. A feature 34, such as a welding boss, a pocket, a draw bead, or the like, is then created. The fillet 36 provides a transition region, bounded by broken lines 38 and 40, between the base surface 32 and the surface feature 34. The slope of fillet region 36, as defined by draft angle 42, must be judiciously selected to facilitate press forming in direction 44 during a stamping operation.

FIG. 2 provides a brief overview of a prior art process for creating surface features with fillets. Beginning with a base surface 50 and a surface feature 52, the designer creates a number of fillet segments 54 separated by individual piecewise fillet profiles 56 which extend between the fillet outer boundary 58 on base surface 50, and the fillet inner boundary 60 on surface feature 52. The inner boundary defines a portion of the feature and the outer boundary defines the entire feature on the base surface. The location and characteristics of each fillet profile 56 extending between outer boundary 58 and inner boundary 60 are largely dependent upon the experience of the designer and selective use of trial-and-error to produce an acceptable part. If the surface feature is subsequently relocated, or a test run indicates difficulty in manufacturing acceptable parts, one or more of the fillet segments 54 and profiles 56 must be recreated.

Figure 3:
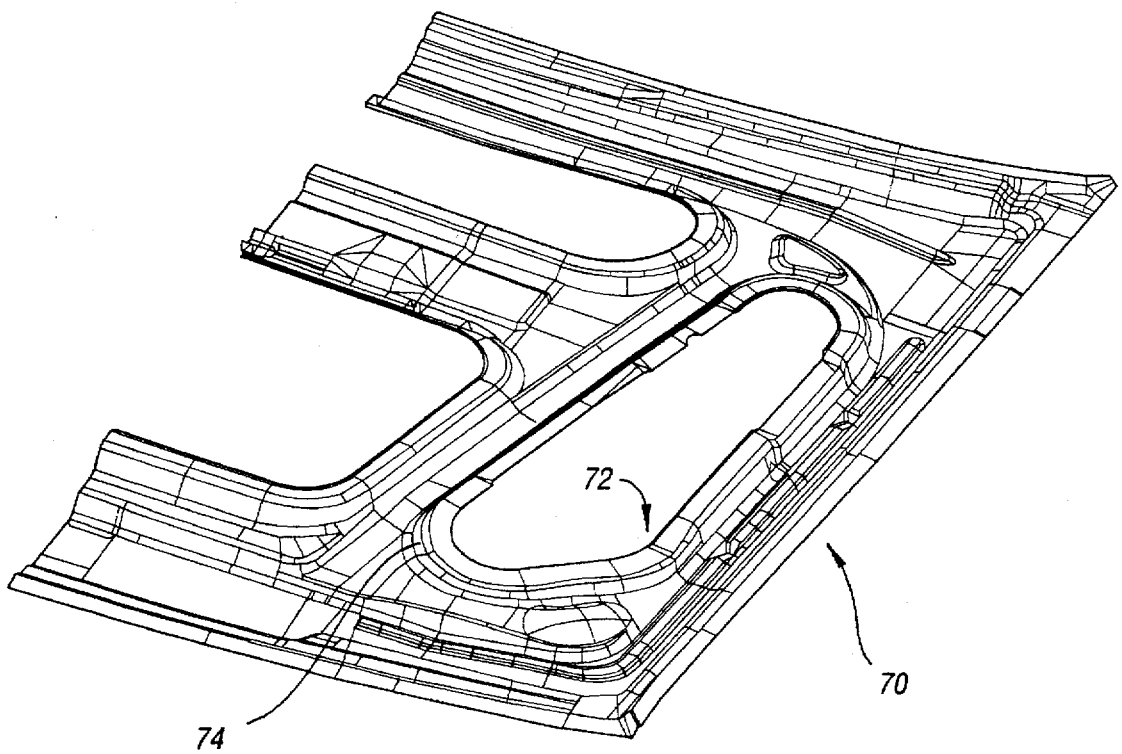
FIG. 3 is an illustration of an inner panel of an automotive door illustrating prior art fillet creation utilizing individual surface patches for each fillet segment.
Figure 5A:
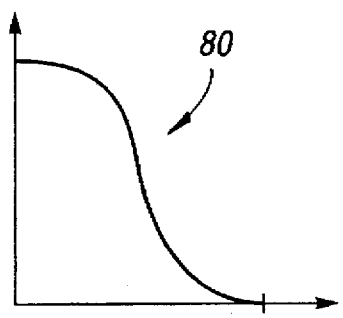
FIG. 5a is a graph illustrating a basis function for use in generation of a fillet profile according to the present invention.
Figure 5B:
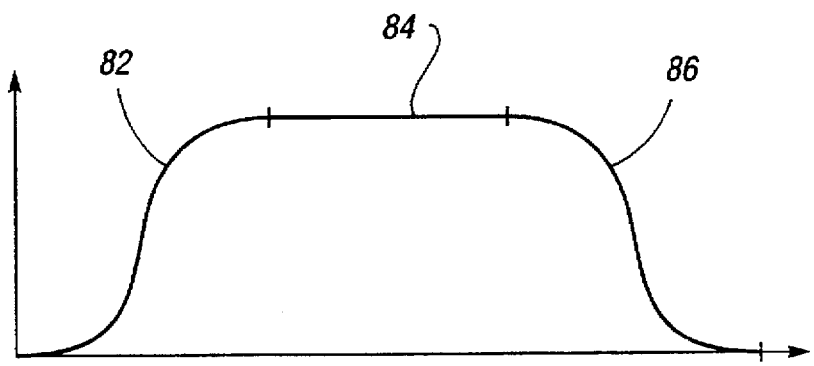
FIG. 5b is a graph illustrating a basis function for an entire feature according to the present invention.
Figure 5C:
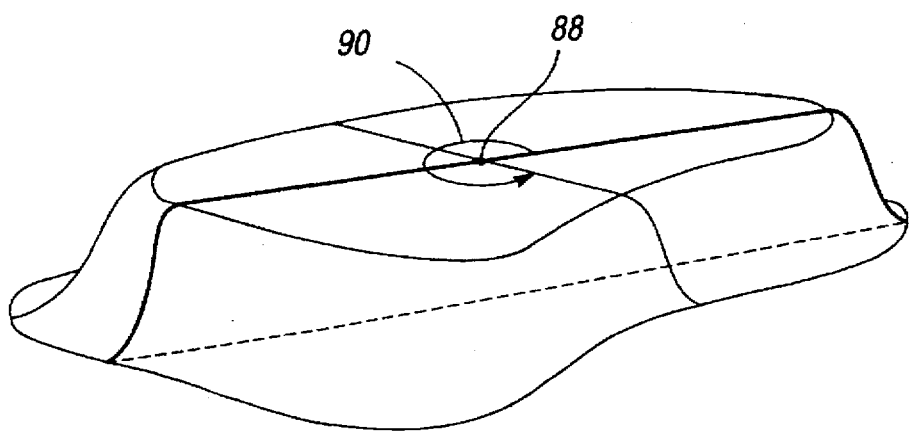
FIG. 5c illustrates a surface feature and fillet region formed according to the present invention.

FIG. 3 illustrates an actual inner door panel 70 having surface features 72 which are connected to a base surface via individually created fillet segments 74. As illustrated, the complexity of such a part necessitates a large number of such fillet segments which requires a great deal of time, even for an experienced designer. Furthermore, a number of modifications are often imposed on an acceptable design to accommodate the addition or deletion of various accessories. Each change then requires recreation of at least a portion of the individual fillet segments.

The present invention overcomes the time-intensive process of individual fillet creation and recreation by applying DSM to create surface features with fillets, similar to the surface feature shown in FIG. 2, by extending DSM to include two closed boundary curves.

The system and method for direct modeling of fillets and draft angles according to the present invention will now be described in greater detail with reference to FIGS. 4 and 5a–5c. The feature formation process begins with step 75 where a general form of the fillet profile is described using a single one-dimensional, e.g. univariate, basis function 80. Continuity at the edges of the fillet region is guaranteed by selecting a basis function with corresponding derivatives of zero at the upper and lower bounds associated with the inner boundary 60 and outer boundary 58, respectively. A variety of functions can be applied to provide different curvature profiles and slope angles. Proper control of the boundary conditions and continuity of the basis function provide a geometrically smooth fillet region. Thus, these are the primary considerations in the construction or selection of an appropriate basis function.

Mathematically, a basis function can be represented as a segment of a polynomial curve over a normalized domain. For example, the normalized domain between zero and unity which includes its endpoints and may be represented by [0,1] may be used. Derivatives at the end points of this domain determine the continuities across the boundary between the surface feature and the fillet in addition to the boundary between the base surface and the fillet. A desired continuity can be obtained by properly selecting a polynomial basis function with corresponding derivatives of zero at the lower and upper bounds of the domain.

Thus, given a boundary continuity of $C^n$, meaning that each derivative up to and including the nth order derivative evaluated at the end points has a value of zero, the basis function $f(t)$ should be a polynomial of order $2n+2$, i.e., $$f(t) = \sum_{i=0}^{2n+1} c_i t^i \tag{1}$$

Subsequently, the coefficients of $f(t)$ can be determined by solving a linear system of equations having $2n+2$ equations represented generally by:

$$f(0)=1$$

$f^{(m)}(0)=0$ for $m=1,n$ $f(1)=0$ \hfill (2)

$f^{(m)}(1)=0$ for $m=1,n$ which enumerate the boundary conditions of the portion of the polynomial used to represent f(t) in the normalized domain. As an example, four basis functions with boundary continuity ranging from $C^0$ to $C^3$ were generated using this methodology and are listed in Table 1.

TABLE 1

Boundary continuities and representative basis functions.

| Boundary Condition | Basis Function |
| --- | --- |
| $C^0$ | $f(t) = 1 - t$ |
| $C^1$ | $f(t) = 1 - 3t^2 + 2t^3$ |
| $C^2$ | $f(t) = 1 - 10t^3 + 15t^4 - 6t^5$ |
| $C^3$ | $f(t) = 1 - 35t^4 + 84t^5 - 70t^6 + 20t^7$ |

Once an appropriate basis function is selected, the process of the present invention continues with block 76, applying a fillet profile, such as fillet profile 82 or 86, to either side of a central region 84 of a surface feature. The feature is formed, as represented by block 77, by sweeping or blending the feature profile about a reference point 88 within the feature boundary, as indicated by arrow 90. A single reference point 88 may be shared by both the outer boundary 58 and the inner boundary 60.

The design of fillets for sheet metal applications often involves the modification of the draft angles to accommodate manufacturing by a stamping press. However, the basis functions are determined based only on the boundary conditions and they do not provide additional degrees of freedom to allow adjustment of fillet draft angles. Once a fillet is created using double boundary DSM according to the present invention, an additional degree of freedom is provided so the fillet region may be modified without recreation. This is accomplished by applying a nonlinear reparametrization or remapping to the basis function as indicated by block 78.

Figure 6A:
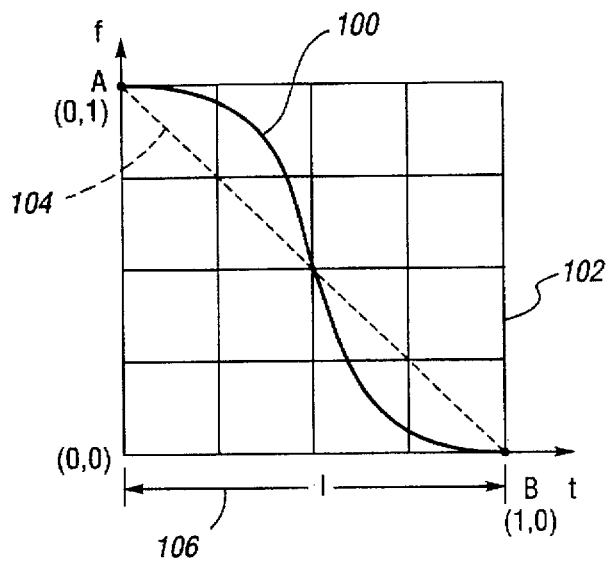
FIG. 6a illustrates a basis function in a reference parameter space according to the present invention.
Figure 6B:
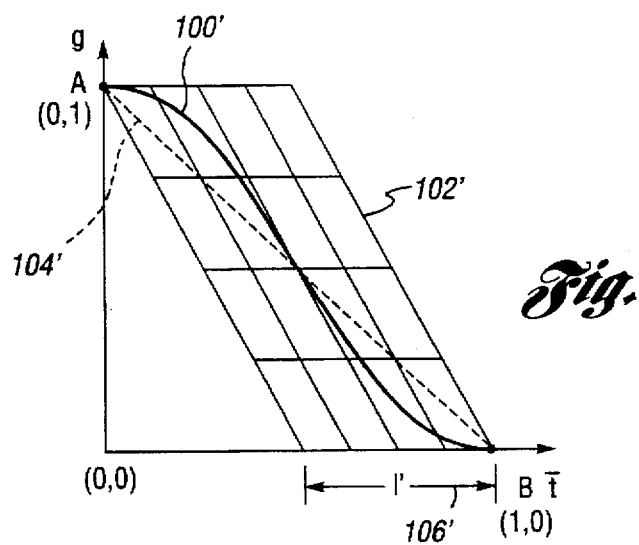
FIG. 6b illustrates a basis function after skewing of the parameter space to reduce the slope of the fillet profile according to the present invention.
Figure 6C:
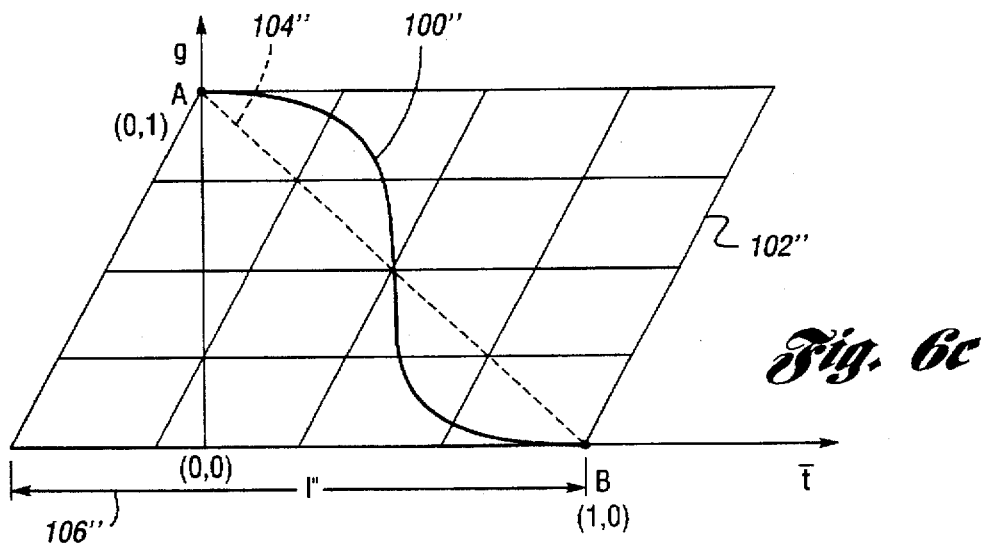
FIG. 6c illustrates a basis function after skewing of the parameter space to increase the slope of the draft angle according to the present invention.
Figure 7:
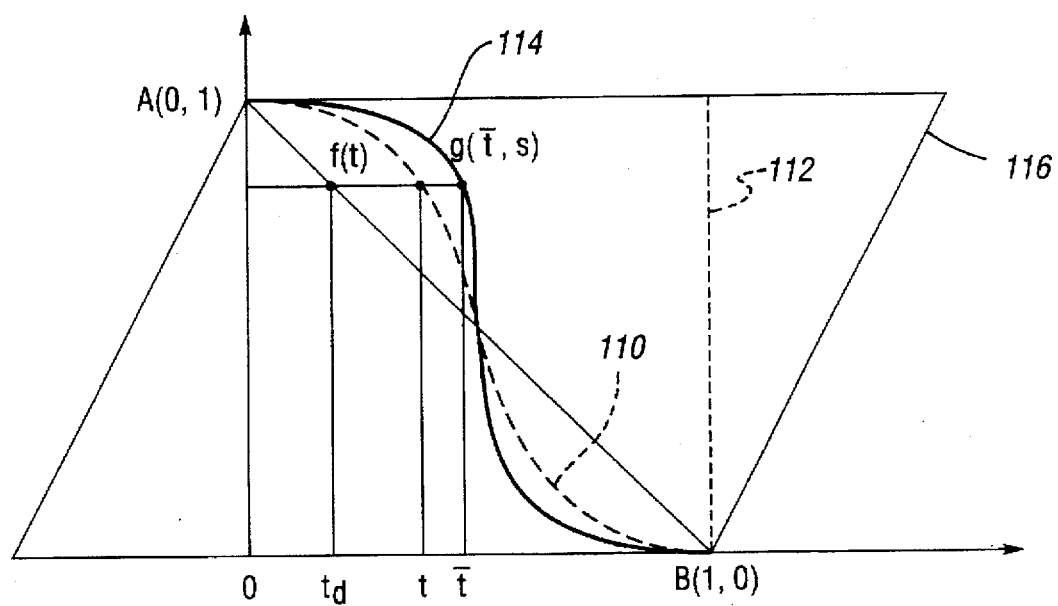
FIG. 7 illustrates superimposed basis functions and parameter spaces corresponding to a reference and a transformed profile according to the present invention.

A non-linear reparametrization is essentially a parameter shifting or remapping scheme, the principle of which is illustrated geometrically in FIGS. 6a–6c. An unskewed parameter grid 102 plotted with a basis function 100 which may be generally represented by a function f(t) is shown in FIG. 6a. To reduce the slope of basis function 100, for instance, the parameter grid 102 can be scaled toward a diagonal line 104 passing through points A (0,1) and B (1,0). As illustrated in FIG. 6b, this scaling affects the t direction only. This results in a skewed parameter space 102' within which lines originally vertical now have negative slopes. Since basis function 100' is embedded within this grid space and deformed in the same way, its slope is thus reduced as well. FIG. 6(c) illustrates an analogous methodology to increase the slope of a basis function resulting in basis function 100". To produce this result, parameter grid 102" is scaled in the t direction relative to diagonal line 104".

The amount of skewing can be quantified by the ratio of the dimension 1' (indicated by reference numeral 106') in the t direction of grid space 102' after skewing, to the corresponding original dimension 1 (indicated by reference numeral 106) prior to performing the skew transformation. Similarly, this ratio may be determined for the corresponding dimension 1" (indicated by reference numeral 106") illustrated in FIG. 6c. This ratio, which is non-negative, is called the skew factor, represented by the variable s.

For slope reduction, as illustrated in FIG. 6b, the skew factor s is less than one. For an increase in slope as illustrated in FIG. 6c, the skew factor s must be greater than one. When the skew factor reaches a certain value denoted by $S_{max}$, the skewed basis function is no longer a single-valued function. This value represents the maximum allowable skewing and is illustrated and described in detail with reference to FIGS. 8–10.

Given the original basis function f(t), the present invention performs a skew transformation on t. The transformed parameter may be represented by $\bar{t}$ and the resulting transformed basis function by $g(\bar{t},s)$, where the skew factor s is considered a parameter. Since $g(\bar{t},s)$ will be the basis function ultimately used for fillet creation, the input parameter for fillet creation under DSM is $\bar{t}$ while the output will be $g(\bar{t},s)$ which is to be derived from f(t).

The first relationship between $g(\bar{t},s)$ and f(t) can be established based on the fact that the skew transformation only affects the space in the t direction, and, as a result, f(t) has no vertical deformation. Therefore, after t is transformed into $\bar{t}$ the corresponding function values are equivalent, that is:

$$g(\bar{t},s)=f(t) \quad (3)$$

Furthermore, as illustrated in FIGS. 6a–6c and 7, the nature of the skew transformation is to scale the space in the t direction with respect to the diagonal line $\overline{AB}$ 104. The original basis function 110 in parameter space 112 is skewed to transformed basis function 114 in parameter space 116. The new location of t after the transformation, i.e., $\bar{t}$, depends on two components: (1) the abscissa of a point on $\overline{AB}$ having the same function value as f(t), as labeled by $t_d$ in FIG. 7 and (2) the abscissa of f(t) minus $t_d$, i.e., $(t-t_d)$. The value of $t_d$ defines the starting point of the scaling while the latter value becomes the base of the scaling by s, such that:

$$\bar{t}=t_d+s(t-t_d) \quad (4)$$

Because $t_d=1-f(t)$, equation (4) becomes:

$$\bar{t}=1-f(t)+s(t-1+f(t)) \quad (5)$$

Equation (5) must be solved for t as an explicit function of $\bar{t}$ so that for a given $\bar{t}$, $g(\bar{t},s)$ may be computed using equation (3). Because equation (5) is an implicit equation coupled with the basis function f(t), its solution can be quite complex and difficult to compute depending on the order of the basis function involved. For example, use of the representative $C^1$ basis function of Table 1 results in the following solution:

$$t=\frac{1}{2}-\frac{3-s}{2*3^{\frac{1}{s}}\sqrt{-1+s}\,(27\sqrt{-1+s}\,+18\sqrt{-1+s}\,\bar{t}+\sqrt{3}\,W)^{1/3}}+\frac{(27\sqrt{-1+s}\,+18\sqrt{-1+s}\,\bar{t}+\sqrt{3}\,W)^{1/3}}{2*3^{\frac{2}{s}}\sqrt{-1+s}} \quad (6)$$

where $$W=\sqrt{-216+216s+9s^2-s^3-324s\bar{t}+324s\bar{t}-108\bar{t}^2+108s\bar{t}^2} \quad (7)$$

For higher order basis functions, the analytical solution can be much longer and more complex, and may even be intractable. Thus, for practical applications, it is often necessary to seek alternative and general approaches to solve the equation.

To find t based on $\bar{t}$, a numerical method such as Newton's iteration or another similar method can be used. By moving $\bar{t}$ to the right hand side of equation (5), the problem becomes how to use Newton's method to find the root of the following implicit equation for a particular $\bar{t}_0$:

$$1-f(t)+s(t-1+f(t))-\bar{t}_0=0 \tag{8}$$

Figure 8:
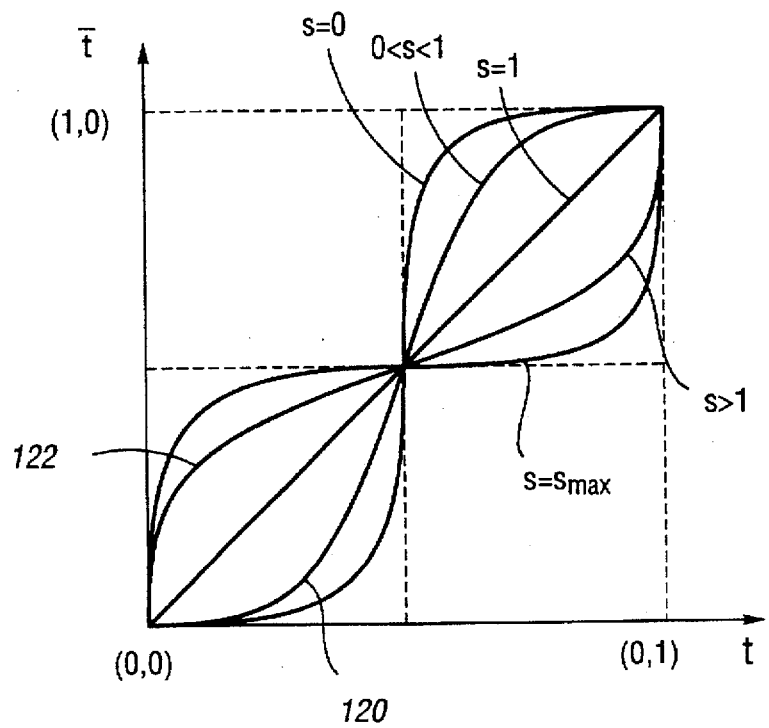
FIG. 8 illustrates the relationship between an original parameter, skew factor, and resulting transformed parameter according to the present invention.

A proper starting point for the iteration should be selected to assure that the iteration will converge to a solution within the domain of the basis function. FIG. 8 depicts the general relationship between t and $\bar{t}$, assuming that the relationship is always single-valued. This can be accomplished by limiting the skew factor s to a value below an allowable upper bound $s_{max}$, which is determined as described in detail below. Within the domain of the basis function, the curves 120 and 122 are monotone in nature. Thus, the only potential difficulties posed for Newton's iterations occur where either a flat tangent (which leads to the complete failure of the iteration) or a small tangent are present. A flat, or horizontal, tangent results in a complete failure of the iteration whereas a sufficiently small tangent may result in a solution which is outside of the feasible domain. To avoid these possibilities, in a preferred embodiment of the present invention, the starting point of the iteration is selected as the point at which the derivative has its largest magnitude, i.e. the steepest portion of the curve. This rule for consistent selection of the starting point is summarized in Table 2.

TABLE 2

| Selection of starting point for Newton's iterations. | | |
|---|---|---|
| | $0 < s < 1$ | $s > 1$ |
| $0 < \bar{t} < 0.5$ | $t_0 = 0.5$ | $t_0 = 0$ |
| $\bar{t} > 0.5$ | $t_0 = 0.5$ | $t_0 = 1$ |

Figure 9A:
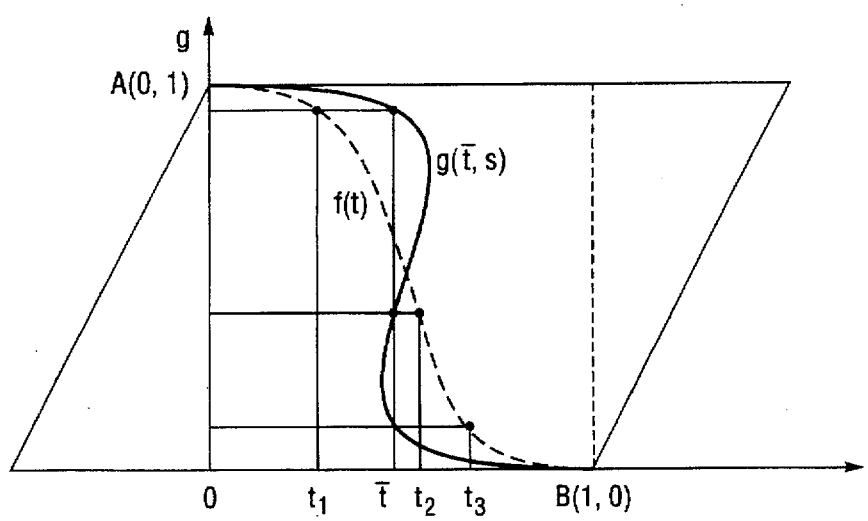
FIG. 9a illustrates a skewed basis function having multiple values resulting from a large skew factor according to the present invention.

As described above, when the skew factor s is larger than unity, excessive skewing of the parameter space can result in multiple-valued basis functions as illustrated in FIG. 9a. It is, therefore, necessary to find the upper bound of the skew factor, or $s_{max}$, below which the skewed basis function g($\bar{t}$,s) will remain single-valued.

Figure 9B:
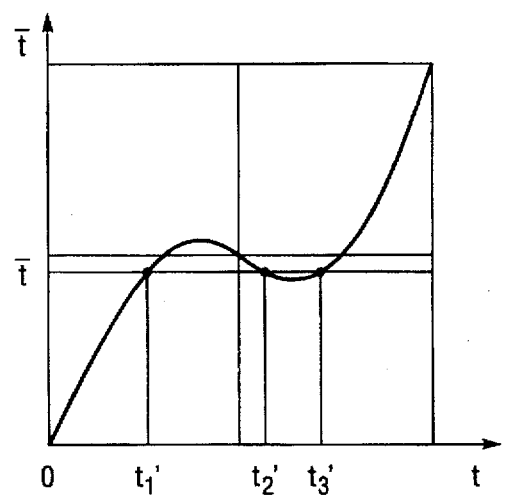
FIG. 9b illustrates the effect of a multiple-valued skewed basis function resulting from a large skew factor in the original parameter space according to the present invention.

As shown in FIGS. 9a and 9b, multiple values of g($\bar{t}$,s) occur where t is not a single-valued function of $\bar{t}$. Thus, the condition to find $s_{max}$ for g($\bar{t}$,s) is equivalent to the condition for t($\bar{t}$,s).

Figure 10:
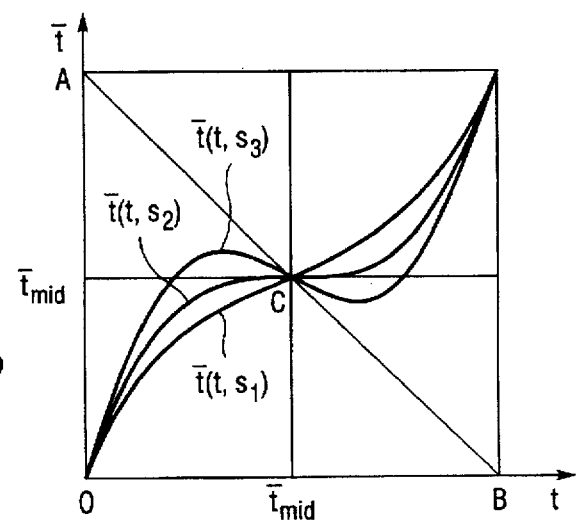
FIG. 10 illustrates the effect of various skew factors on the skewed basis function according to the present invention.

FIG. 10 manifests the trend of $\bar{t}$(t,s), and thus t($\bar{t}$,s) as the skew factor, s, increases. Due to the symmetry of boundary conditions used for its construction within the domain, the $\bar{t}$(t,s) curve is skew symmetric about the diagonal line $\overline{AB}$ and passes through the center of the domain space, i.e. the point C($t_{mid}$,$\bar{t}_{mid}$) shown in FIG. 10. As also illustrated, $\bar{t}$(t,s) is originally a monotone function with strictly positive tangents. As the skew factor increases, however, the curve tends to stay closer to the horizontal line passing through point C, causing the tangent at this point to decrease. Eventually, as the skew factor continues to increase, this tangent will pass through zero and become negative. At that point $\bar{t}$(t,s) loses its characteristic as a monotone function and t($\bar{t}$,s) is no longer a single-valued function. Thus, the upper bound for the skew factor occurs where a zero tangent of $\bar{t}$(t,s) occurs at point C, i.e., the upper bound, $s_{max}$, must satisfy the following equation:

$$\frac{d\bar{t}(t_{min},s)}{dt} = 0 \tag{9}$$

For the four representative basis functions of Table 1, substituting 0.5 for $t_{min}$ into equation (1) yields:

$$\frac{d\bar{t}(0.5,s)}{dt} = 0 \tag{10}$$

Substituting equation (5) into equation (10) for $\bar{t}$, results in:

$$s_{max} = \frac{f(0.5)}{1+f(0.5)} \tag{11}$$

This equation can be solved easily for the four basis functions and the results are provided in Table 3.

TABLE 3

| Upper bounds of the skew factor for four representative basis functions. | |
|---|---|
| Boundary Condition | $s_{max}$ |
| $C^0$ | 4 |
| $C^1$ | 3 |
| $C^2$ | 2.14 |
| $C^3$ | 1.84 |

A major advantage of the skew transformation is its ability to maintain the original boundary conditions of the basis functions. As described above, the basis functions are constructed to satisfy a given set of boundary conditions. To verify that the function g($\bar{t}$,s) also satisfies those boundary conditions, the value for t is set to zero and substituted into equation (5) to obtain:

$$\bar{t}=1-f(0)+s(0-1+f(0)) \tag{12}$$

Because f(0)=1 as determined by the original boundary continuity condition, $\bar{t}$=0 so that equation (3) results in:

$$g(0,s)=f(0)=1 \tag{13}$$

Similarly, by substituting t=1 into equation (5) and noting that f(1)=0, then $\bar{t}$(1,s)=1, and:

$$\bar{t}=1-f(1)+s(1-1+f(1))=1 \tag{14}$$

Therefore, by equation (3):

$$g(1,s)=f(1)=0 \tag{15}$$

which verifies the conditions expressed in equations (8) and (10).

To verify the remaining boundary conditions for g($\bar{t}$), i.e.,:

$$g^{(m)}(0)=0 \text{ for } m=1,n$$

$$g^{(m)}(1)=0 \text{ for } m=1,n \tag{16}$$

g($\bar{t}$) can be written as a composite function of t according to equations (3) and (5) as follows:

$$g(\bar{t})=f(t(\bar{t})) \tag{17}$$

Thus, using the general formula for the m-th order derivative of a composite function provides:

$$\frac{d^m}{dt^m} g(\bar{t}) = \frac{d^m}{dt^m} f(t(\bar{t})) = sym \sum_{i=t_1+\ldots+t_1=m}^{s} \sum \quad (18)$$

$$\frac{m!}{t_1!\ldots t_1!} \left(\frac{d^i f}{dt^i}\right) \left(\frac{d^{t_1}t}{dt^{t_1}} \ldots \frac{d^{t_1}t}{dt^{t_1}}\right)$$

where sym denotes the operation of symmetrization and $$sym(A) \cdot (h_1, \ldots h_m) = \frac{1}{n!} \sum^{s} A[h_{s(1)}, \ldots, h_{s(m)}] \quad (19)$$

where the summation is extended over all permutations s of 1, 2, ... m. Note that since $f^{(m)}(0)$ and $f^{(m)}(1)=0$, and furthermore, since the mapping of t into $\bar{t}$ is smooth and continuous, which means that $d^m t(0)/d\bar{t}^m$ are defined and bounded, therefore, (18) sums up to zero at both $\bar{t}=0$ and $\bar{t}=1$. Thus, $g(\bar{t})$ has the same boundary conditions as $f(t)$.

Thus, the skew transformation allows the adjustment of the fillet profile without the loss of the original boundary continuities between the feature and the fillet region transition as well as between the base surface and the fillet region transition. Furthermore, this unique reparametrization (from shifting t's point of view) does not disturb the basis function by adding other geometric anomalies, such as inflection points, which can introduce stress concentrations in the fillet.

Figure 11A:
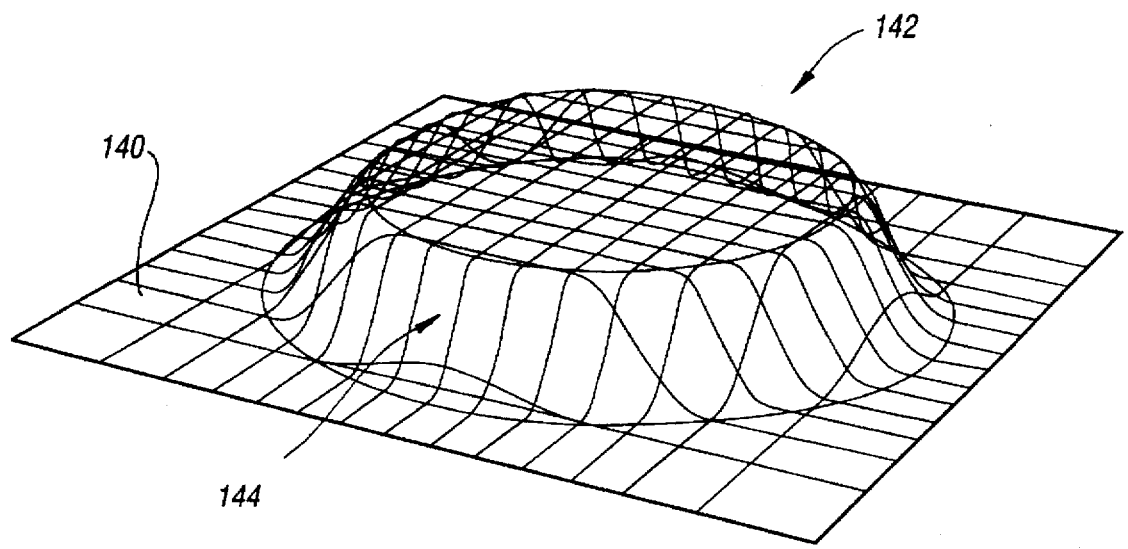
FIG. 11a illustrates a direct modeled surface feature and draft angle with reduced slope according to the present invention.
Figure 11B:
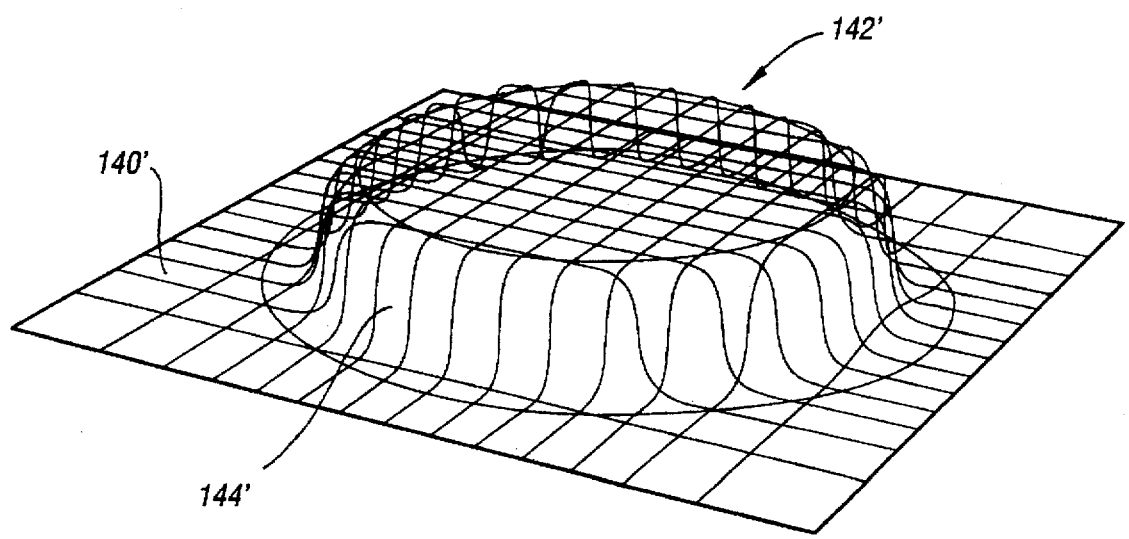
FIG. 11b illustrates a direct modeled surface feature and draft angle with increased slope according to the present invention.

Referring now to FIGS. 11a and 11b, an example of slope modification according to the present invention is shown. FIG. 11a illustrates a base surface 140 with a surface feature 142 and a fillet region 140 having a reduced slope. FIG. 11b illustrates the same surface feature after manipulation of the fillet region according to the present invention to produce a fillet region 144' having an increased slope.

Figure 12:
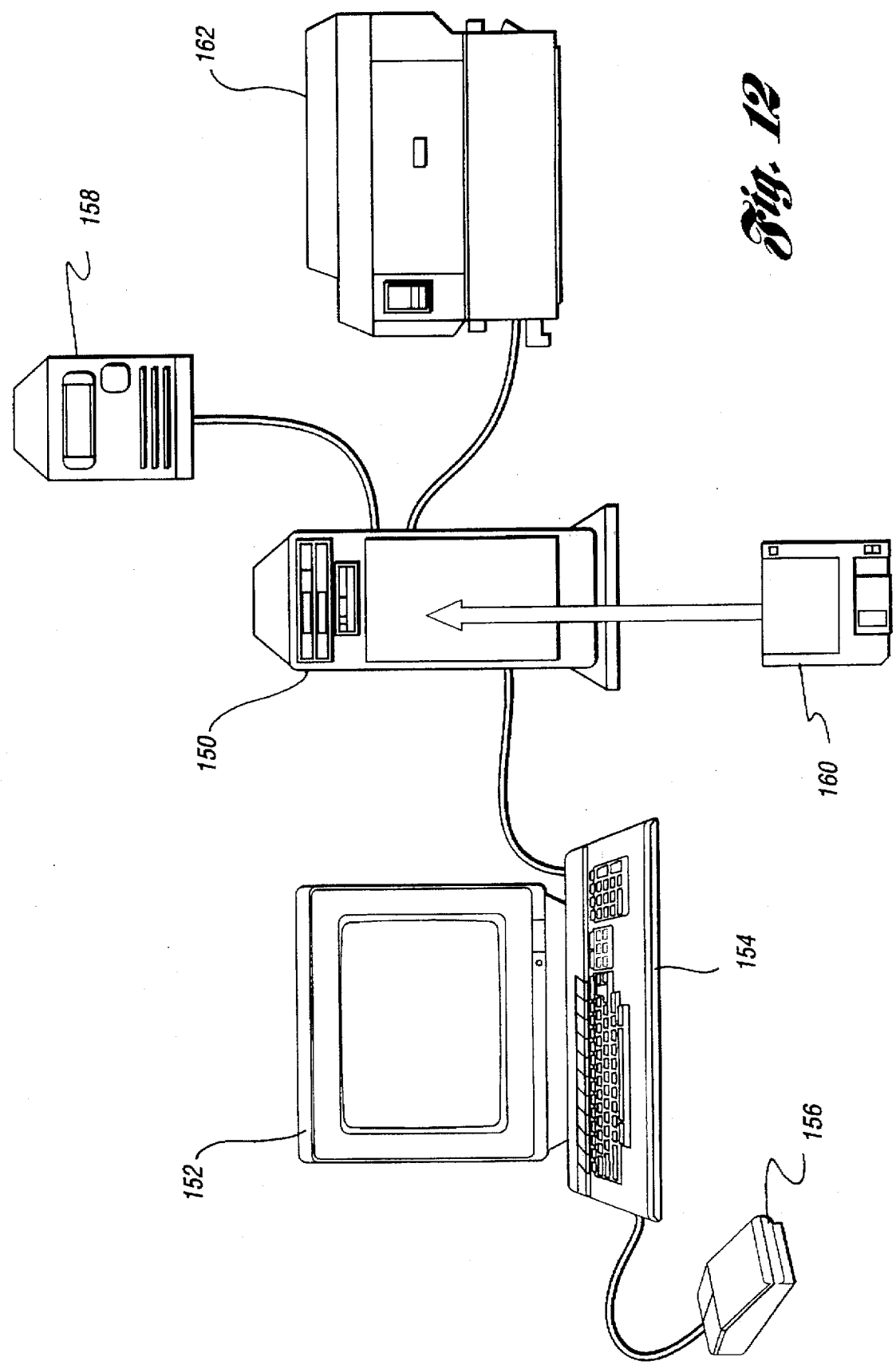
FIG. 12 is a system block diagram illustrating various components of a system for direct modeling of fillets and draft angles according to the present invention.

A representative system for direct modeling of fillets and draft angles according to the present invention is graphically depicted in FIG. 12. The system includes a processing unit 150 connected to a user interface which may include a display terminal 152, keyboard 154, pointing device 156, and the like. Processing unit 150 preferably includes a central processing unit, memory, and stored program instructions which implement a method for direct modeling of fillets and draft angles according to the present invention. The stored instructions may be stored within processing unit 150 in memory or any non-volatile storage such as magnetic or optical media, EPROM, EEPROM, or the like. Alternatively, instructions may be loaded from removable magnetic media 160, optical media 158, or the like. In a preferred embodiment, the system includes a general purpose computer programmed to implement the functions illustrated and described with reference to FIGS. 1–11. Of course, a system according to the present invention could also be embodied in a dedicated device which includes various combinations of hardware and software. In a preferred embodiment, the system also includes a printer 162 connected to the processing unit 150.

The direct feature and fillet modeling system and method of the present invention can be applied to a wide range of engineering tasks including automotive inner panel design. A door inner panel similar to that shown in FIG. 3 has been created using the present invention beginning with a relatively simple base surface and several double boundary DSM features. Compared to the door inner panel of FIG. 3, this door panel includes the same major features, however, forming those features using DSM required significantly less data of description, thus resulting in meaningful savings in both user time and computer resources. In addition, once those features have been created, they can be relocated within the base surface using the present invention without recreation. Furthermore, these features can be modified, independent of each other, through adjustment of decoupled parameters, such as varying the skew factor to obtain a desired fillet draft angle.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

What is claimed is:

1. A method of forming a fillet region having a first transition from a surface feature to the fillet region and a second transition from a base surface to the fillet region, the method comprising:

selecting a general form of a fillet profile with a single basis function to describe the fillet;

applying the fillet profile to either side of a constant central region on the surface feature so as to form a surface feature profile; and sweeping the surface feature profile within the feature boundary while maintaining a predetermined continuity at the first and second transitions to parametrically form the fillet region such that the fillet region may be subsequently modified while maintaining the predetermined continuity at the first and second transitions.

2. The method of claim 1 wherein the step of selecting a single basis function comprises selecting a single basis function having derivatives with a value of zero when evaluated at the first and second transitions.

3. The method of claim 1 further comprising:

modifying the fillet region while maintaining the predetermined continuity at the first and second transitions by applying a reparametrization to the single basis function in a parametric space.

4. The method of claim 3 wherein the reparametrization is a nonlinear reparametrization.

5. The method of claim 3 wherein the non-linear reparametrization is a nonlinear reparametrization derived from a generalized basis function such that an equivalent transformation is applied without regard to position.

6. The method of claim 3 wherein the step of applying a reparametrization comprises:

describing the single basis function within a reference parameter space;

skewing the reference parameter space relative to a diagonal line extending between the first and second transitions so as to skew the single basis function accordingly; and mapping the skewed basis function to an orthogonal domain.

7. The method of claim 6 wherein the step of skewing comprises skewing toward the diagonal line so as to decrease slope of the basis function.

8. The method of claim 6 wherein the step of skewing comprises uniformly skewing away from the diagonal so as to increase slope of the basis function.

9. The method of claim 6 wherein the single basis function is a monotone function selected by solving for a polynomial function based on a set of end conditions and skewing the polynomial function while maintaining the end conditions and the monotonicity of the single basis function.

10. A system for forming a fillet region having a first transition from a surface feature to the fillet region and a second transition from a base surface to the fillet region the system comprising:

a storage device for storing a predetermined set of instructions; and a processor for executing at least a portion of the predetermined set of instructions to select a general form of a fillet profile with a single basis function to describe the fillet, apply the fillet profile to either side of a constant central region on the surface feature so as to form a surface feature profile, and sweep the surface feature profile within the feature boundary while maintaining a predetermined continuity at the first and second transitions to form the fillet region parametrically such that the fillet region may be subsequently modified while maintaining the predetermined continuity at the first and second transitions.

11. The system of claim 10 wherein the processor is further operative to select a single basis function having derivatives with a value of zero when evaluated at the first and second transitions.

12. The system of claim 10 wherein the processor is further operative to modify the fillet region while maintaining the predetermined continuity at the first and second transitions by applying a reparametrization to the single basis function in a parametric space.

13. The system of claim 12 wherein the processor modifies the fillet region while maintaining the predetermined continuity at the first and second transitions by applying a nonlinear reparametrization to the single basis function.

14. The system of claim 12 wherein the processor is operative to apply a nonlinear reparametrization derived from a generalized basis function such that an equivalent transformation is applied without regard to position.

15. The system of claim 12 wherein the processor applies a reparametrization comprising:

describing the single basis function within a reference parameter space;

skewing the reference parameter space relative to a diagonal line extending between the first and second transitions so as to skew the single basis function accordingly; and mapping the skewed basis function to an orthogonal domain.

16. The system of claim 15 wherein the processor is operative to perform skewing of the reference parameter space including skewing the reference parameter space toward the diagonal line so as to decrease slope of the basis function.

17. The system of claim 15 wherein the processor is operative to perform the skewing of the reference parameter space by uniformly skewing away from the diagonal so as to increase slope of the basis function.

18. The system of claim 15 wherein the single basis function is a monotone function and wherein the processor is operative to perform skewing including determining an upper bound for a skew factor wherein skew factors not greater than the upper bound maintain the monotonicity of the single basis function in the skewed parameter space such that the step of mapping results in a single-valued function.

19. A program storage device readable by a programmable processor, the program storage device containing instructions operative to implement a method of forming a fillet region having a first transition from a surface feature to the fillet region and a second transition from a base surface to the fillet region, the method comprising:

selecting a general form of a fillet profile with a single basis function to describe the fillet;

applying the fillet profile to either side of a constant central region on the surface feature so as to form a surface feature profile; and rotationally sweeping the surface feature profile within the feature boundary while maintaining a predetermined continuity at the first and second transitions to form the fillet region parametrically such that the fillet region may be subsequently modified while maintaining the predetermined continuity at the first and second transitions.

20. The program storage device of claim 19 further including instructions for selecting a single basis function having derivatives with a value of zero when evaluated at the first and second transitions.

* * * * *